United States Patent [19]

Haneda et al.

[11] Patent Number: 4,742,988

[45] Date of Patent: May 10, 1988

[54] ELECTRICAL APPARATUS INCLUDING SOLENOID DEVICE AND ENERGIZATION CONTROL CIRCUIT THEREFOR

[75] Inventors: Hideo Haneda, Toyota; Mamoru Nakamura, Kariya; Jun Funakawa, Nagoya; Hiroki Oka, Toyota; Takeshi Nakane, Okazaki, all of Japan

[73] Assignee: Aisin Seiki Kabushikikaisha, Japan

[21] Appl. No.: 824,476

[22] Filed: Jan. 23, 1986

[30] Foreign Application Priority Data

Jan. 23, 1985 [JP] Japan .............................. 60-7897[U]
Nov. 25, 1985 [JP] Japan .............................. 60-264135

[51] Int. Cl.⁴ .............................................. F16K 31/06

[52] U.S. Cl. .......................... 251/129.01; 251/129.04; 439/692

[58] Field of Search ...................... 251/129.01, 129.15, 251/129.04; 339/45 R, 193 P, 45 M

[56] References Cited

U.S. PATENT DOCUMENTS

| | | | |
|---|---|---|---|
| 2,727,670 | 12/1955 | Shore | 251/129.04 X |
| 3,257,034 | 6/1966 | Dumm, III | 251/129.01 X |
| 3,790,858 | 2/1974 | Brancaleone | 339/193 P X |
| 4,112,885 | 9/1978 | Iwata et al. | 251/129.04 X |
| 4,124,192 | 11/1978 | White | 251/129.15 |

FOREIGN PATENT DOCUMENTS

| | | | |
|---|---|---|---|
| 2736169 | 2/1979 | Fed. Rep. of Germany | 339/193 P |

*Primary Examiner*—Arnold Rosenthal
*Attorney, Agent, or Firm*—Sughrue, Mion, Zinn, Macpeak, and Seas

[57] ABSTRACT

An electrical apparatus is disclosed which comprises a combination of a solenoid device such as a solenoid valve, a relay or a plunger driving solenoid device and an energization control circuit which energizes the solenoid device. One end of an electrical cable is connected to the solenoid valve while the other end of the cable is connected to a connector. The electrical cable prevents the transmission of oscillations which the solenoid valve experiences to the connector. The energization control circuit is housed within the connector. The energization control circuit responds to a changing of a given switch from its on to its off condition, by energizing the electrical coil only during a given time interval. When the time interval has passed, it interrupts the energization of the electrical coil, and the energization control circuit itself is substantially disconnected from the power source.

8 Claims, 7 Drawing Sheets

ELECTRICAL APPARATUS INCLUDING SOLENOID DEVICE AND ENERGIZATION CONTROL CIRCUIT THEREFOR

BACKGROUND OF THE INVENTION

The invention relates to a combination of a solenoid device having an electrical coil and an energization control circuit therefor, and in particular, to a solenoid valve apparatus including a solenoid valve for opening and closing a fluid passage, as one of solenoid devices, and an energization control circuit for controlling the energization of the electrical coil of the solenoid valve. A solenoid valve apparatus of the kind described may be used to control the air intake of a negative pressure controlled engine which is applied to a negative pressure actuator driving a throttle valve of an engine onboard a vehicle.

Referring to FIG. 4 initially which illustrates a conventional solenoid valve in section, it includes a non-magnetic bobbin 12 which may be molded from synthetic resin and around which an electrical coil 3 is disposed. A stator core 5 of a magnetizable material is inserted into the bobbin 12 and is fixed in place. A fluid passage communicating with a third fluid port 11 is formed in alignment with the axis of the core 5. A movable plunger 6 of a magnetizable material is disposed to the left of the core 5, and is urged to the left by a coiled compression spring 8 which abuts against the core 5 at its one end and against the core 6 at its other end. A first valve element 13 is fixedly mounted on the left end face of the core 6 while a second, annular valve element 14 is fixedly mounted on the right end face of the core 6. The coil bobbin 12 is integrally formed with a port member 2 as a continuous portion thereof, in which a first and a second fluid port 9, 10 are defined. The right end of the first fluid port 9 is disposed opposite to the valve element 13 and is closed thereby. The outside of the coil 3 is covered by a casing member 4. A yoke 7 of a magnetizable material has a left end *7a* and a right end *7b*, both of which are folded. The left end *7a* bears against both the port member 2 and an inwardly turned, left end flange of the casing member 4 while the right end *7b* bears against the right end face of the stator core 5. A connector pin 15 is fixedly mounted in the bobbin 12 and is electrically connected to the coil 3, and extends through a connector receiver 4a which is integral with the casing member 4.

When the coil 3 is energized, there is produced a path for the magnetic flux extending through the stator core 5, the movable core 6, the yoke 7 and returning to the stator core 5, whereby the movable core 6 is attracted to the stator core 5, whereupon the first valve element 13 moves away from the right end opening of the port 9 and to the right while the second valve element 14 abuts against the left end face of the stator core 5. In this manner, the third port 11 is closed while the first port 9 communicates with the second port 10. When the coil 3 is deenergized, the first port 9 is closed by the valve element 13 while the second port 10 communicates with the third port 11, as shown in FIG. 4. A solenoid valve of the kind described is disclosed, for example, in U.S. Pat. No. 4,326,696 issued to Eiji Ishikawa et al.

When a solenoid valve of the kind described is used to control the running of a vehicle at a constant speed, for example, the third port 11 is connected to the intake manifold, not shown, of an engine onboard a vehicle, or a source of negative pressure, the first port 9 communicates with the atmosphere, and the second port 6 is connected to a negative pressure actuator (not shown) which drives a throttle valve. When the coil 3 remains deenergized, a negative pressure is applied to the actuator while the atmospheric pressure is applied to the actuator when the coil 3 is energized. When the coil 3 is pulsed at a given duty cycle, a pressure which depends on the duty cycle is applied to the actuator.

The engine on the vehicle is rendered operative upon turning an ignition switch on and is rendered inoperative upon turning the ignition switch off. When the ignition switch is turned off, the temperature of a fuel within a carburetor rises in response to the engine interrupting to operate, whereby a vapor of fuel is generated to increase the concentration of a gas mixture within the carburetor to an excessively high value. Such an excessively high concentration of the gas mixture causes a poor starting condition for the engine to operate for the next time. To cope with this problem, as illustrated in FIG. 5, the carburetor is provided with an outer vent OTV, which is connected to a canister CNT through a solenoid valve EMV, the energization of which is controlled by a control circuit CCT to maintain the valve EMV energized for a given time interval T upon turning the ignition switch off to thereby introduce the fuel vapor within the carburetor to the canister CNT. In this manner, the concentration of the gas mixture within the carburetor is lowered to provide an improved subsequent starting condition. When the solenoid valve 1 shown in FIG. 4 is used as the solenoid valve EMV, the first port 9 is connected to the vent OTV while the second port 10 is connected to the canister CNT. Since it is sufficient that the valve EMV operates as a switching valve, the third port 11 may be omitted from connection. When a conventional control circuit CCT is employed, the valve EMV is energized for a given time interval T upon turning the ignition switch off, so that the voltage from a power source or a battery of the vehicle is maintained applied to the control circuit CCT if the ignition switch is off, causing a power dissipation by the electrical circuit of the control circuit CCT to cause a reduction in the battery voltage. Accordingly, it is preferred that the control circuit CCT be constructed in a manner such that the power dissipation is minimized after the time interval T upon turning the ignition switch off.

In any event, in the prior art practice, the solenoid valve 1 is mounted within an engine room of the vehicle, and the connector receiver 4a and the connector pin 15 of the valve 1 are engaged by a female connector connected to one end of a electrical lead (not shown). The lead extends to the interior of the vehicle so that it may be connected to an energization control circuit located within a dashboard of the vehicle. An electrical current of a relatively high level which is sufficient to drive the movable core 6 passes through the lead. Within the engine room, oscillations are applied to the valve 1, whereby the connection between the female connector (not shown) connected to the electrical lead may be temporarily disengaged from the connector pin 15 within the connector receiver 4a as a result of such oscillations, giving rise to electrical sparks which damage the area of contact between the female connector and the connector pin 15 to cause a poor electrical interconnection. Since the lead which carries the energizing current of the coil is relatively heavy, it requires a certain space for its disposition from the engine room to the interior of the vehicle. Such disposition of the electrical lead may be difficult in some instances.

SUMMARY OF THE INVENTION

It is a first object of the invention to reduce the transmission of oscillations from the solenoid valve to a connector which connects the valve to a feed lead.

It is a second object of the invention to minimize the likelihood of a poor connection of a feed path associated with a connector which is connected to a solenoid valve.

It is a third object of the invention to reduce the power dissipation of an energization control circuit for a solenoid device which energizes an electrical coil of the solenoid device to drive a plunger.

In accordance with the invention, a solenoid valve has an electrical coil, to which one end of a feed lead is directly connected in a fixed manner while the other end of the feed lead is connected to an energization control circuit, which is in turn connected to a connector and which is housed within the housing of the connector. With this arrangement, oscillations applied to the solenoid valve are absorbed by the feed lead without being transmitted to the connector. In this manner, a poor electrical contact at the connector is minimized.

In a preferred embodiment of the invention, the feed lead is relatively short and has a length which is sufficient to isolate the transmission of oscillations therethrough. The connector is connected with a single connector to which a battery feed lead and a control signal lead are connected. Only the control signal lead is wired to the dashboard within the vehicle while the battery feed lead is connected to a battery feed bus located either within the engine room or outside the compartment, without being wired into the vehicle.

In the preferred embodiment of the invention, the energization control circuit includes a constant voltage circuit, one end of which is connected to one terminal of a power source while the other end is electrically connected to the other room terminal of the power source in a selective manner through first switching means. Timer means is connected to the constant voltage circuit and initiates a timing operation when the constant voltage circuit is electrically connected across the power source so that during a time interval T during which the timing operation is effective, the constant voltage circuit delivers a voltage of a level (time interval signal) which is different from the voltage level developed at other times. A switching control circuit is provided which renders the first switching means to a status in which the other term nal of the power supply is electrically connected to the other end of the constant voltage circuit in response to a switch, for example, an ignition switch, being changed from its closed to its open condition, which renders the first switching means to a status in which the other terminal of the power supply is electrically connected to the other end of the constant voltage circuit during the time the timer means develops a time interval signal, and which renders the first switching means to a status in which the other terminal of the power supply is electrically disconnected from the other end of the constant voltage circuit whenever the timer means does not develop a time interval signal. A coil energization circuit energizes an electrical coil such as associated with the solenoid valve during the time the timer means develops a time interval signal.

With this arrangement, when a switch such as an ignition switch, for example, is changed from its closed (engine rotating) to its open (engine deactivated) condition, the constant voltage circuit is energized and the timer means initiates its timing operation to allow the electrical coil to be energized to open the valve during the given time interval T. When the time interval T has passed, the timer means times out to deenergize the constant voltage circuit, thus ceasing to energize the electrical coil. Since the constant voltage circuit is deenergized under this condition, the power dissipation by the constant voltage circuit as well as by the timer means is substantially eliminated, thus minimizing the power dissipation of the apparatus which controls the energization of the electrical coil.

Other objects and features of the invention will become apparent from the following description of several embodiments thereof with reference to the drawings.

DESCRIPTION OF PREFERRED EMBODIMENTS

Figure 1A:
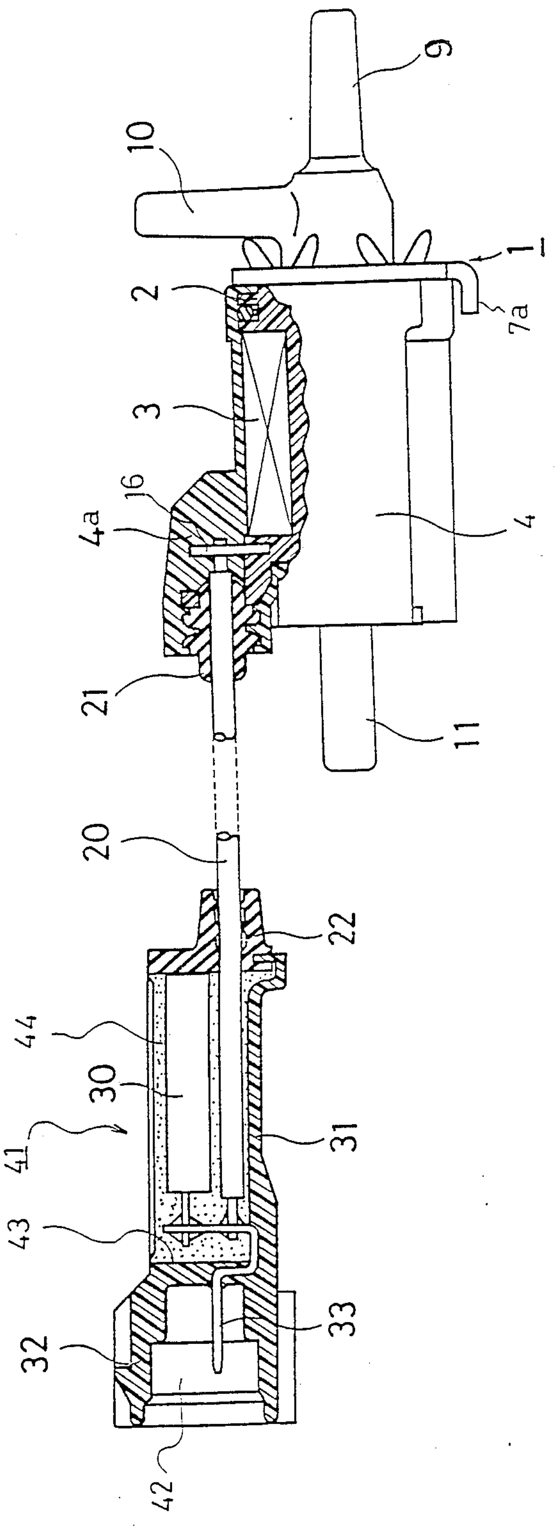
FIG. 1*a* is a side elevation, partly broken away, of one embodiment of the invention.
Figure 4:
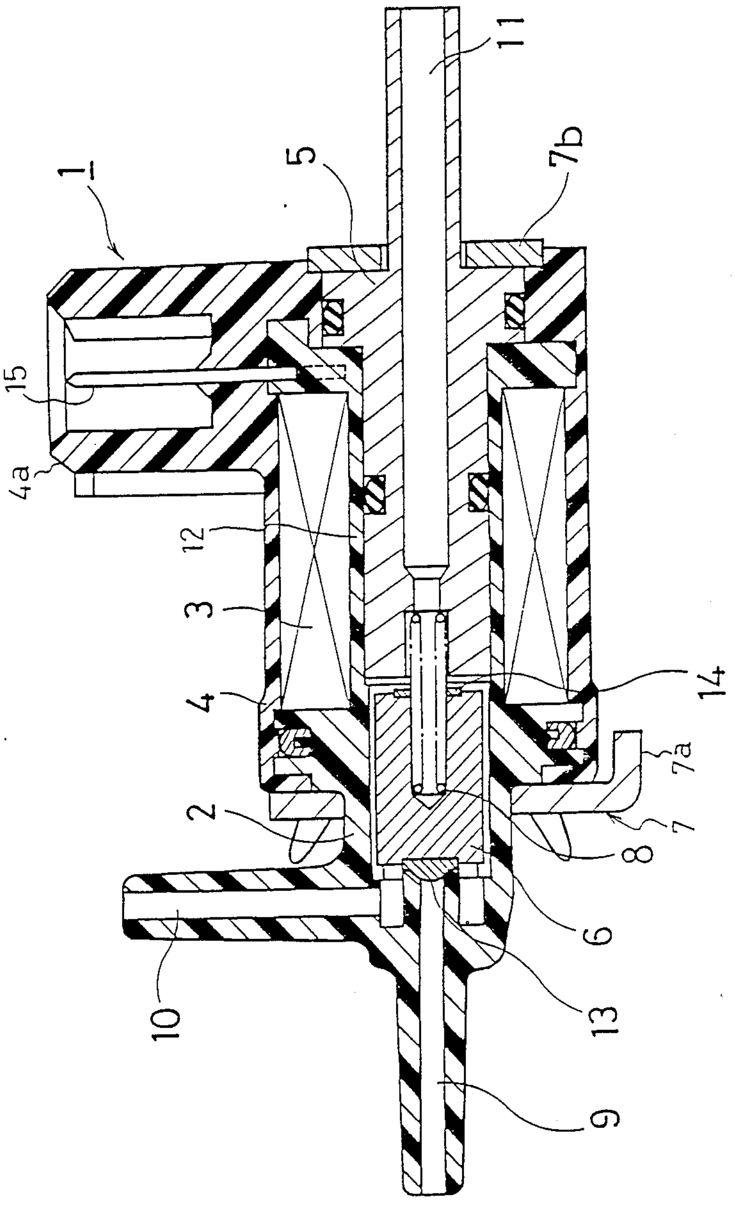
Fig. 4 Prior Art
FIG. 4 is a longitudinal section of a conventional solenoid valve.

Referring to FIG. 1*a* which shows a preferred embodiment of the invention, a solenoid valve 1 includes a casing member 4 which is formed with a lead support member 4*a*, in substitution to a connector receiver. A pair of terminal pins 16 are connected to an electrical coil 3, and one end of feed leads of an electrical cable 20 having a relatively short length is connected to the terminal pins. The cable 20 is contained within a rubber bushing 21, which is a press fit into the lead support member 4*a* of the casing member 4. The internal construction of the solenoid valve is substantially the same as that of the solenoid valve shown in FIG. 4, and therefore will not be described in detail. The other end of the feed leads of the cable 20 is connected to connection pins 33 of a connector 41.

The connector 41 includes a casing member 31 which is formed into a compartment 42 for receiving a female connector and another compartment 43 for containing an energization control circuit therein. Extending through a wall which represents a partition between the both compartments 42, 43 are a total of three pins 33, including a pair of feed pins for connection with the ground terminal and the positive terminal of a battery and another pin carrying a control signal. The pins 33 have their one end extending into the compartment 42 and other end extending into the compartment 43. Every pin 33 is connected to a respective printed electrode, for connection with the ground terminal and the positive terminal of a power source and with a control signal line, on a printed circuit board which carries an energization control circuit 30. In addition, the pair of feed leads of the cable 20 are connected to two of the three pins 33 which are used for connection with the positive and the negative terminal. As shown in FIG. 1*a*, one end of the electrical cable 20 is disposed within the compartment 43 with a support member 22 formed of rubber secured to the casing member 31 and supporting this end of the cable 20. After connecting the electrical cable 20 to the pins 23 and introducing the energization circuit 30 into the compartment 43 and connected with the main pin 33, synthetic resin 44 is injected into the compartment 43 to coat the energization control circuit 30.

Figure 5:
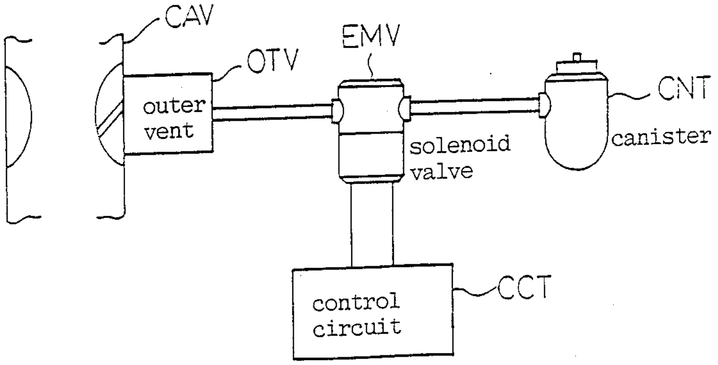
Fig. 5 Prior Art
FIG. 5 is a block diagram of a conventional engine intake system.

A female connector, not shown, which matingly engages the connector 41 is connected to three electrical leads, namely, two feeds leads and one control signal lead, and the two feed leads are connected to positive and negative buses connected to a battery. The control signal lead is wired into the dashboard within the vehicle and is connected to a normally open contact of an ignition switch, not shown. In this embodiment, the first port 9 of the solenoid valve 1 is connected to an outer vent OTV (see FIG. 5) and the second port 10 is connected to a canister CNT. Thus, in this embodiment, the solenoid valve 1 is employed as a switching valve EMV.

Figure 1B:
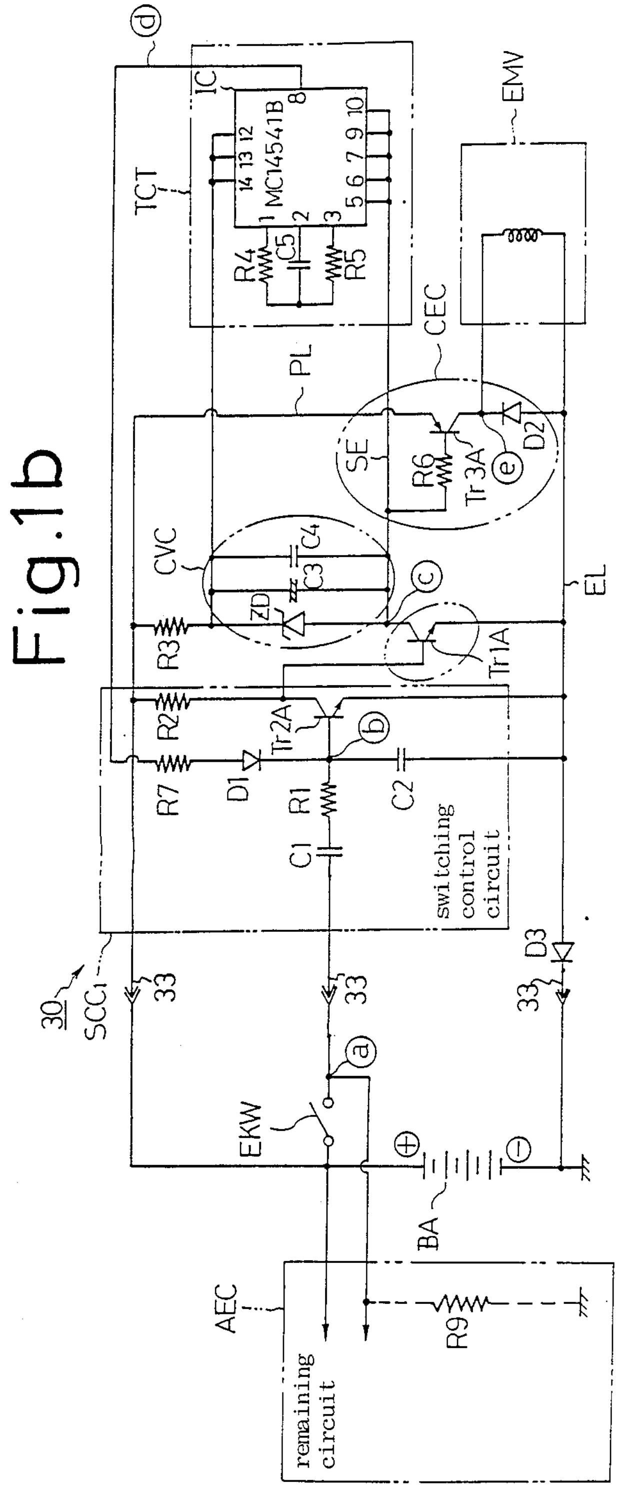
FIG. 1*b* is a circuit diagram of an energization control circuit shown in FIG. 1*a;*

The electrical circuit of the energization control circuit 30 shown in FIG. 1*a* is indicated in FIG. 1*b*, which also shows the connection between a vehicle battery BA, an ignition switch EKW and the energization control circuit 30.

Referring to FIG. 1*b*, the ignition switch EKW, a switching control circuit SCC1 and other electrical circuit AEC of the vehicle are connected to the positive terminal of the vehicle battery BA. The negative terminal of the battery BA is connected to a conductor which represents the ground connection to the body.

The energization control circuit 30 includes a constant voltage circuit CVC, one end or positive terminal of which is connected to the positive terminal of the battery BA while the other end or negative terminal SE is connected to the ground line EL through a transistor Tr1A which represents first switching means. Accordingly, when the transistor Tr1A is on, the negative terminal SE of the constant voltage circuit CVC is connected to the negative terminal of the battery BA through the ground line EL and diode D3. When the transistor Tr1A is off, the entire constant voltage circuit CVC assumes the same potential as the positive potential of the battery BA, and hence dissipates no power.

The constant voltage circuit CVC is connected to a timer IC which is constructed as an integrated circuit. The timer IC used is an integrated circuit Model MC 14541B manufactured and sold by Motorola Inc., in the United Status. It includes an oscillator which produces a frequency determined by externally connected resistors R4, R5 and capacitor C5, a counter and a logic gate. In this example, it initiates a timing operation when a control input terminal 6 assumes a negative or ground potential, and develops a voltage of a negative or ground level at an output terminal 8 and develops a voltage of a positive level at the same output terminal 8 otherwise. In response to the application of a given voltage or the voltage from the power source from the constant voltage circuit CVC and a simultaneous change of the control input terminal 6 from a positive to a negative level, it initiates a timing operation to change the voltage developed at the output terminal 8 from a positive to a negative level. After a given time interval T has passed, it returns the voltage at the output terminal 8 from the negative to the positive level.

A coil energization circuit CEC is connected to the negative terminal SE of the constant voltage circuit CVC, the ground conductor EL and the positive terminal of the battery BA. The circuit CEC is connected to the electrical coil of the solenoid valve 1 shown in FIG. 1*a* (which is used as the solenoid valve EMV and therefore will be represented by the reference character EMV). When the negative terminal SE of the constant voltage circuit CVC assumes a negative or ground level or when the transistor Tr1A representing the first switching means is turned on, a transistor Tr3A within the coil energization circuit CEC conducts to energize the electrical coil of the solenoid valve EMV, thus allowing the outer vent OTV (FIG. 5) to communicate with the canister CNT.

The first switching means or transistor Tr1A is turned on or off by turning transistor Tr2A within the switching control circuit SCC1 on and off. It will be seen that both the potential at the contact of the ignition switch EKW and the potential obtained at the output terminal 8 of the timer IC are applied to the base of the transistor Tr2A. Connected to the other contact of the ignition switch EKW are other electrical circuits and instruments of the vehicle, which are collectively represented by AEC, and this contact is connected to the body ground through a resistor R9 which represents these other electrical circuits and instruments.

Figure 1C:
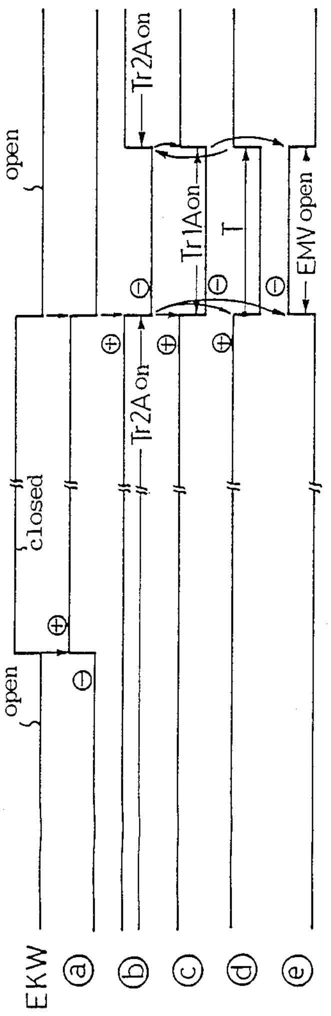
FIG. 1*c* graphically shows a series of timing charts illustrating various electrical signals appearing at selected points within the energization control circuit shown in FIG. 1*b;*

The operation of the electrical circuit shown in FIG. 1*a* will now be described with reference to timing charts shown in FIG. 1*c* which illustrate the electrical signals appearing at selected points within the electrical circuit. When the ignition switch EKW is open (or engine is deactivated) as shown in FIG. 1*b*, the potential at a point a which represents one input to the switching control circuit SCC1 is negative (or the ground level), but the timer IC is connected to the positive terminal of the battery BA through the constant voltage circuit CVC and thus assumes a positive potential, and produces a positive potential at the output terminal 8 of the timer. This applies a positive potential to the base of the transistor Tr2A, which is therefore turned on while the first switching means or transistor Tr1A is off. Accordingly, the negative terminal SE of the constant voltage circuit CVC assumes a positive potential, which renders the transistor Tr3A in the coil energization circuit CEC off, maintaining the solenoid valve EMV deenergized to interrupt the connection between the outer vent OTV (FIG. 5) and the canister CNT.

When the ignition switch EKW is closed (or engine in rotation), the positive potential from the battery BA is applied to the input terminal a of the switching control circuit SCC1, which is directly applied to the base of the transistor Tr2A, which is therefore maintained on. The first switching means or transistor Tr1A continues to be off and the solenoid valve EMV remains deenergized.

When the ignition switch EKW is now changed from its closed to its open (engine deactivated) condition, the input terminal a of the switching control circuit SCC1 is connected to the ground through the resistor R9 of other electrical circuits AEC, whereby capacitors C1 and C2 discharge through the resistor R9. This renders the base of the transistor Tr2A to assume a negative potential, thus turning the transistor Tr2A off. In response thereto, the transistor Tr1A is turned on. This establishes a power supply to the constant voltage circuit CVC and the timer IC, and since the control input terminal 6 of the timer IC is connected to the negative terminal SE and hence assumes a negative level, the timer IC is triggered and the potential a the output terminal 8 thereof changes from a positive to a negative (or ground) level, ceasing to apply a positive potential to the base of the transistor Tr2A. The timer IC initiates its timing operation, during which the transistor Tr2A is maintained off while the transistor Tr1A is maintained on. As the transistor Tr1A is turned on, the transistor Tr3A in the coil energization circuit CEC is turned on to energize the solenoid valve EMV, thus establishing a communication between the outer vent OTV (FIG. 5) and the canister CNT.

When a given time interval T has passed since the power supply to the timer IC is established (or transistor Tr1A is turned on), the timer IC times out and its output terminal 8 returns from a negative to a positive potential. Thereupon, a positive potential is applied to the base of the transistor Tr2A, which is therefore rendered conductive while the transistor Tr1A is turned off as is the transistor Tr3A. The constant voltage circuit CVC and the timer IC are then electrically disconnected from the battery BA, and the solenoid valve EMV is deenergized to interrupt the communication between the outer vent OTV (FIG. 5) and the canister CNT.

In the energization control circuit 30 shown in FIG. 1*b* and described above, the both transistors Tr1A and Tr3A conduct only during the time interval T after the ignition switch EKW is changed from its closed to its open condition. These transistors remain off otherwise, and hence there is no power dissipation in the constant voltage circuit CVC, the timer IC and the coil energization circuit CEC. Though the transistor Tr2A conducts and the resistor R2 and the transistor Tr2A dissipate the power, such power dissipation are of a reduced magnitude since the resistance of the resistor R2 can be maximized to limit the current flow to a small value. The power dissipation during the standby mode is greatly reduced since the constant voltage circuit CVC which represents the most significant component in respect of the power dissipation is disconnected.

Figure 2:
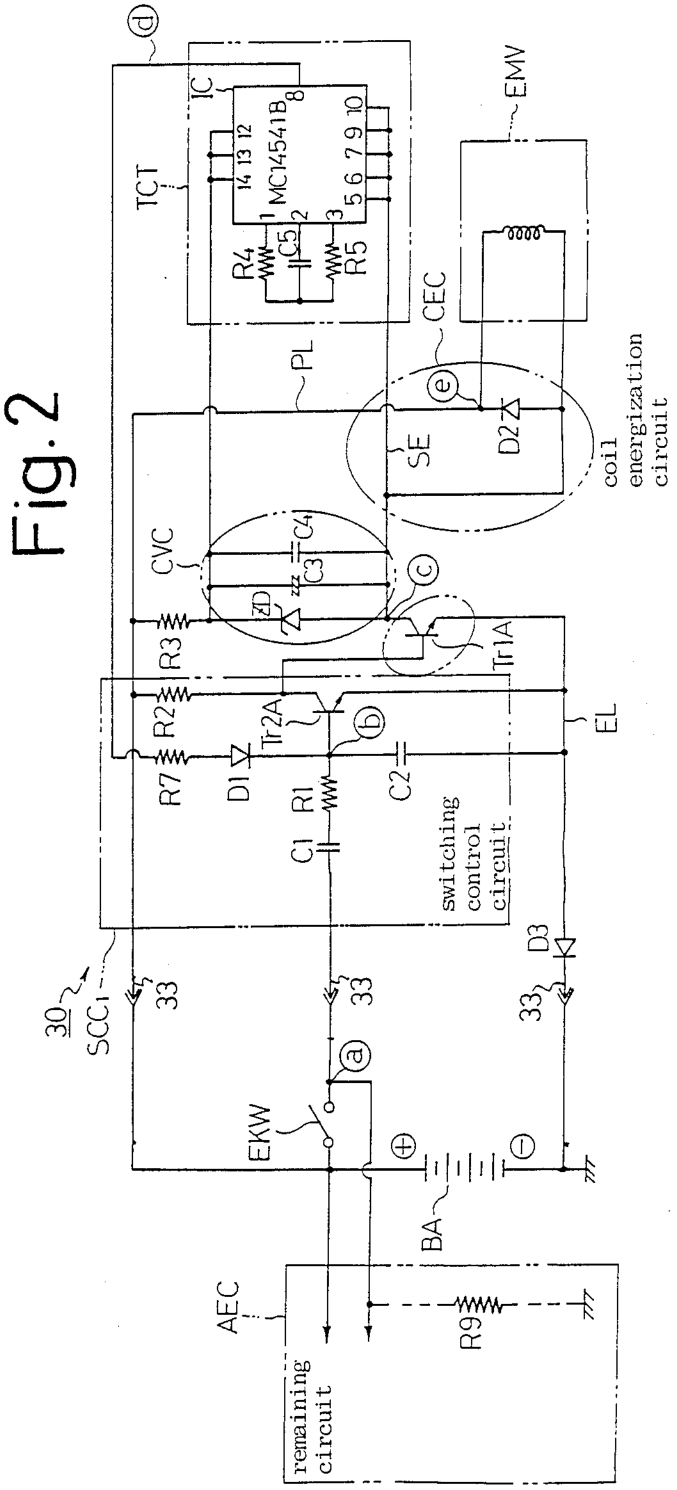
FIG. 2 is a circuit diagram of an energization control circuit according to another embodiment.

FIG. 2 shows a modification of the energization control icrcuit 30 shown in FIG. 1*b*. In this modification, the transistor Tr3A shown in FIG. 1*b* is eliminated from the coil energization circuit CEC, and one end of the electrical coil of the solenoid valve EMV is directly connected to the positive terminal of the battery BA while the other end is connected to the negative terminal SE of the constant voltage circuit CVC or to the transistor Tr1A which represents the first switching means. The arrangement and operation of the modification is similar to the arrangement and operation of the energization control circuit 30 shown in FIG. 1*b* except for the description relating to the transistor Tr3A, and heance a corresponding description is omitted.

Figure 3B:
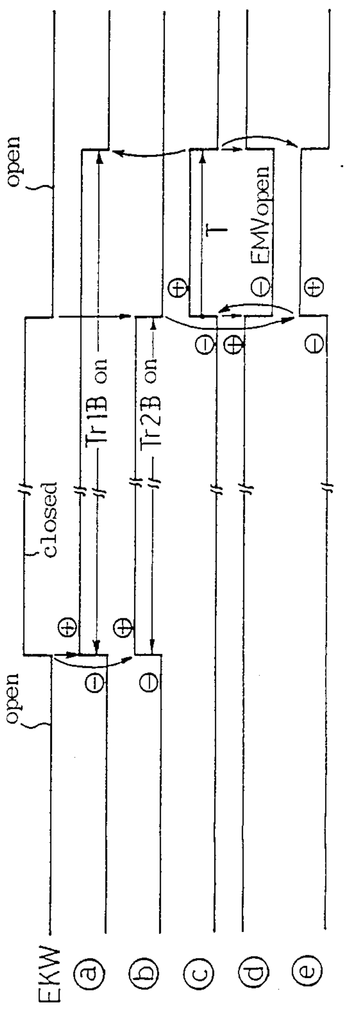
FIG. 3*b* graphically shows a series of timing charts illustrating various electrical signal appearing at selected points within the energization control circuit shown in FIG. 3*a;*
Figure 3A:
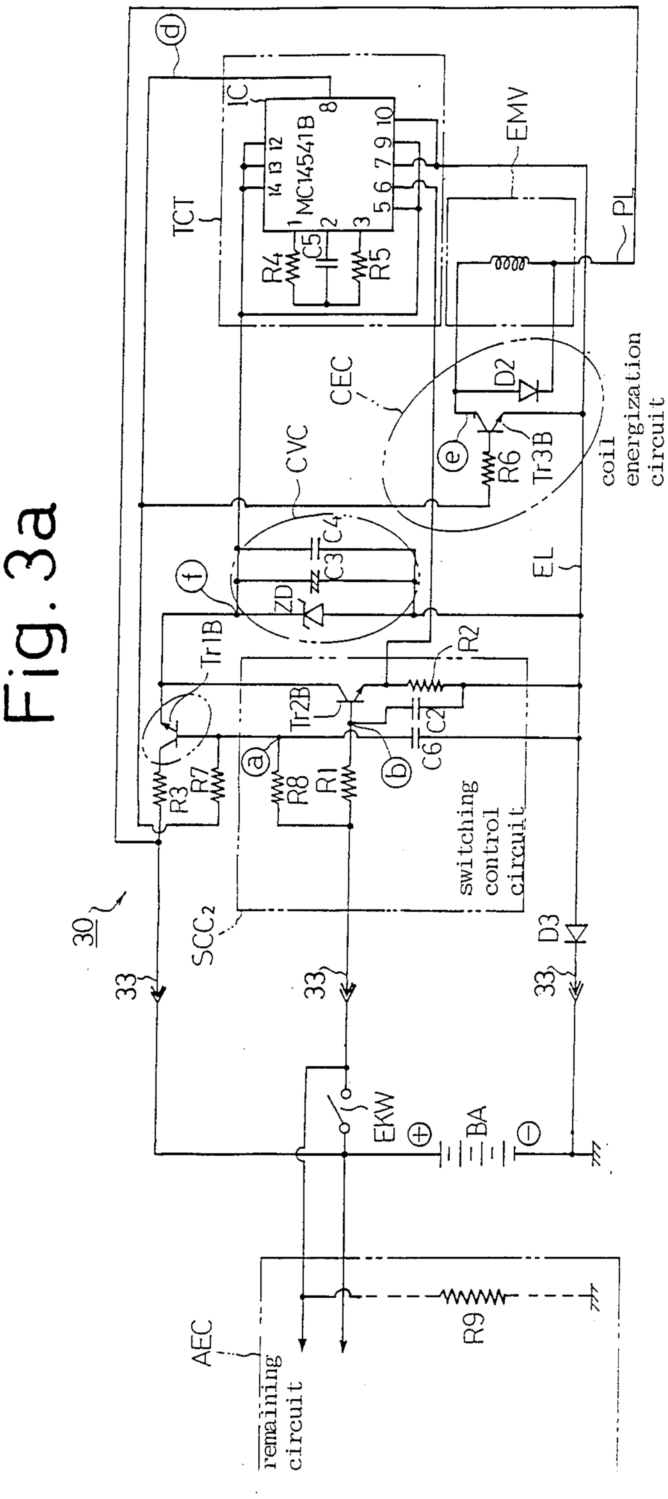
FIG. 3*a* is a circuit diagram os an energization control circuit according to a further embodiment.

FIG. 3*a* shows the electrical circuit diagram of an enargization control circuit according to a further embodiment, and various electrical signals appearing at selected points within this electrical circuit are graphically shown in FIG. 3*b*. In this embodiment, a transistor Tr1B is connected as first switching means between the positive terminal of the battery BA and the positive terminal of the constant voltage circuit CVC. The timer IC is wired so that it develops a positive potential at its output terminal 8 during the timing operation and develops a negative (or ground) potential otherwise. In a corresponding manner, the timer IC initiates its timing operation when the potential at the control input terminal 6 changes from a positive to a negative potential, and accordingly the control input terminal 6 is connected to the emitter of the transistor Tr2B.

While the ignition switch EKW is open (engine deactivated), the input terminal of a switching control circuit SCC2 which is connected to one contact of the ignition switch EKW is connected to the body ground throug resistor R9 representing other electrical circuits AEC carried on the vehicle, and hence assumes a negative potential. Since the potential developed at the output terminal 8 of the timer IC is negative, transistor Tr1B representing the first switching means and transistor Tr2B in the control circuit SCC2 are off, and the constant voltage circuit CVC and the timer IC both assume a negative potential and electrically disconnected from the battery BA. The negative potential at the output terminal 8 of the timer IC is applied to the base of transistor Tr3B in a coil energization circuit CEC, which transistor is therefore off and the solenoid valve EMV is deenergized. Consequently, in this emboidment, there is no substantial power dissipation by the constant voltage circuit CVC, the timer IC, the coil energization circuit CEC and the switching control circuit SCC2 during the standby mode when the ignition switch EKW is open (engine deactivated).

When the ignition switch EKW is closed (engine in rotation), the positive potential from the battery BA is applied through the switch EKW to the bases of transistors Tr1B and Tr2B, both of which are turned on. This establishes a power supply to the constant voltage circuit CVC and the timer IC. Since a positive potential is applied through the transistor Tr2B to the control input terminal 6 of the timer IC, the latter does not initiate a timing operation. The potential at the output terminal 8 of the timer IC remains to be negative, and the transistor Tr3B in the coil energization circuit CEC remains off.

When the ignition switch EKW is changed to its open position (engine deactivated), the input terminal of the switching control circuit SCC2 which is connected to the contact of the switch EKW is connected to the ground through resistor R9 of other electrical circuits AEC, whereby capacitors C2 and C6 discharge. However, the capacitor C6 discharges more slowly than the capacitor C2 and hence the transistor Tr2B is initially turned off while the transistor Tr1B remains on. Thereupon, the control input terminal 6 of the timer IC assumes a negative (ground) potential, and hence the timer IC changes to develop a positive potential at the output terminal 8, thus initiating a timing operation. This positive potential is applied to the base of the transistor Tr1B, which therefore continues to be on. As a result of the output terminal 8 of the timer IC assuming the positive potential, the transistor Tr3B in the coil energization circuit CEC conducts to energize the solenoid valve EMV. When a given time interval T passes since the initiation of the timing operation, the timer IC times out to return the output terminal 8 to the negative (ground) potential. This turns the transistor Tr1B off, whereby the constant voltage circuit CVC, the timer IC and the coil energization circuit CEC are disconnected from the battery BA and the solenoid valve EMV is deenergized.

In this embodiment, the switching control circuit SCC2, the constant voltage circuit CVC, the timer IC and the coil energization circuit CEC are all disconnected from the battery BA during the standby mode when the ignition switch EKW is open (engine deactivated), thus substantially eliminating the power dissipation during the standby mode.

It will be appreciated that in the solenoid valve apparatus described above, the connector is separated from the solenoid valve, and the connection between the solenoid valve and the connector is provided by an electrical cable. Since the energization control circuit is housed within the connector, oscillations which the solenoid valve experiences are substantially prevented from being transmitted to the connector, thus reducing the probability that electrical sparks may be produced in the mechanical contacts of the connector as a result of the current flow which energizes the electrical coil. When the solenoid valve apparatus is used in controlling the running speed of a vehicle or in controlling the air intake of an engine, only the control signal lead connected to the connector is wired into the dashboard within the vehicle while the feed leads which are used to energize the electrical coil are connected to the battery within an engine room or outside the compartment, avoiding the need of wiring into the compartment of the vehicle. In the energization control circuit, the electrical coil associated with the solenoid valve or the like is energized for a given time interval in response to a switch such as an ignition switch being changed from its closed to its open condition, and after the given time interval has passed, substantial portions of the apparatus including the constant voltage circuit are disconnected from a power source such as a battery, thus greatly reducing the power dissipition during the standby mode. In this manner, a wasteful power dissipation is removed, and a good starting condition after a prolonged period of idle condition is secured.

It should be understood that the above description relates to preferred emboidments of the invention, but that a number of changes, modifications and substitutions can be made therein without departing from the spirit and teaching of the invention as defined by the appended claims. By way of example, the solenoid device is not limited to a solenoid valve, but the invention can be similarly implemented for a relay, a plunger driving solenoid device or the like, for example. Where a relay is used to energize a certain electrical device, the energization cntrol circuit 30 may be connected to the electrical coil of the relay. Where a plunger driving solenoid device is used to drive a certain mechanical apparatus, the energization control circuit 30 may be connected to the electrical coil of the plunger driving solenoid device. At any rate, when a selected switch changes from its on to its off condition, either the relay or the plunger driving solenoid device is energized for a given time interval thereafter, and is deenergized when the given time interval has passed, and simultaneously the energization of the coil energization controlling device is substantially interrupted.

What is claimed is:

1. An electrical apparatus comprising:

a solenoid device for opening and closing a fluid passage formed therein by the movement of a movable core and including a coil wound around a bobbin and a stator core fixed in one end of a center opening of the bobbin;

a connector including a casing member separate from said solenoid device forming an open compartment and connection terminals each having one end extending into the open compartment;

an electrical cable having one end connected to the coil and the other end extended into the open compartment; and a coil energization control circuit housed within the open compartment, directly connected to the other end of the electrical cable and the connection terminals and coated with synthetic resin injected in the compartment.

2. An electrical apparatus according to claim 1 in which the casing member has a second compartment for receiving a female connector and the connection terminals being pins extending from the second compartment to the first mentioned open comprtment.

3. An electrical apparatus comprising:

a solenoid device for opening and closing a fluid passage formed therein by the movement of a movable core and including a coil would around a bobbin and a stator core fixed in one end of a center opening of the bobbin;

an electrical cable having one end connected to the coil;

a connector connected to the other end of the electrical cable;

a coil energization control circuit housed within the connector; and said energization control circuit comprises:

a constant voltage circuit having its one end connected to one terminal of a power source;

first switching means haviang a status in which the other end of the constant voltage circuit is electrically connected to the other terminal of the power source and a second status in which the connection between the other end of the constant voltage circuit and the other terminal of the power source is interrupted;

timer means having at least two power supply terminals and a control input terminal, one of the power supply terminals being connected to said one of the constant voltage circuit and the other power supply teminal connected to the other end of the constant voltage circuit, the timer means developing a potential of the same polarity as the potential at said one terminal of the power source when the first switching means assumes the second status, the timer means responding to a reversal in the potential applied to the control input terminal thereof by developing a potential of the opposite polarity from the potential at said one terminal for a given time interval and developing a potential of the same polarity as the potential of said one terminal of the power source when the given time interval has passed;

a switching control circuit for rendering the first switching means into its first status at latest when a switch is changed from its closed to open condition to cause a reversal in the potential applied to the control input terminal, for rendering the first switching means into its first status when the timer means develops a potential of the opposite polarity from the potential of said one terminal of the power source, and for rendering the first switching means into its second status when the switch is open and the timer means develops a potential of the same polarity; and coil energizing means for energizing the electrical coil during the time the timer means develops a potential of the opposite polarity.

4. An electrical apparatus according to claim 3 in which the power source comprises a battery (BA) and said one terminal of the power source represents a positive terminal while said other terminal of the power source represents a negative terminal, one end of the constant voltage circuit being connected to the positive terminal of the battery, and the first switching means comprising a switching element (Tr1A) connected between the negative terminal of the battery and the other end of the constant voltage circuit.

5. An electrical apparatus according to claim 3 in which the power source comprises a battery (BA) and said one terminal of the power source represents a negative terminal while the other terminal of the power source represents a positive terminal, one end of the constant voltage circuit being connected to the negative terminal of the battery, the first switching means comprising a switching element (Tr1B) connected between the positive terminal of the battery and the other end of the constant voltage circuit.

6. An electrical apparatus comprising:

a solenoid device having an electrical coil;

a constant voltage circuit having one end connected to one terminal of a power source;

first switching means having a first status in which the other end of the constant voltage circuit is electrically connected to the other terminal of the power source and a second status in which the connection between the other end of the constant voltage circuit and the other terminal of the power source is interrupted;

timer means having at least two power supply terminals and a control input terminal, one of the power supply terminals being connected to said one end of the constant voltage circuit and the other power supply terminal connected to the other end of the constant voltage circuit, the timer means developing a potential of the same polarity as the potential at said one terminal of the power source when the first switching means assumes the second status, the timer means responding to a reversal in the potential applied to the control input terminal thereof by developing a potential of the opposite polarity from the potential at said one terminal for a given time interval and thereafter developing a potential of the same polarity as the potential at said one terminal of the power source;

a switching control circuit for rendering the first switching means into its first status at latest when a switch is changed from its closed to its open condition to cause a reversal in the potential applied to the control input terminal, for rendering the first switching means into its first status when the timer means develops a potential of the opposite polarity from the potential at said one terminal of the power source and for rendering the first switching means into its second status when the switch is open and the timer means develops a potential of the same polarity;

and coil energizing means for energizing the electrical coil during the time the timer means develops a potential of the opposite polarity.

7. An electrical apparatus according to claim 6 in which the power source comprises a battery (BA), one end of the power source being a positive terminal while the other terminal of the power source represents a negative terminal, one end of the constant voltage circuit being connected to the positive terminal of the battery, the first switching means comprising a switching element (Tr1A) connected between the negative terminal of the battery and the other end of the constant voltage circuit.

8. An electrical apparatus accoridng to claim 6 in which the power source comprises a battery (BA), one end of the power source being a negative terminal while the other terminal of the power source is a positive terminal, one end of the constant voltage circuit being connected to the negative terminal of the battery, the first switching means comprising a switching element (Tr1B) connected between the positive terminal of the battery and the other end of the constant voltage circuit.

* * * * *